United States Patent
Afshar et al.

(10) Patent No.: US 7,899,032 B1
(45) Date of Patent: Mar. 1, 2011

(54) THIRD PARTY SERVICE SUPPORT WITH A VOICE OVER INTERNET PROTOCOL (VOIP) NETWORK

(75) Inventors: Siroos Afshar, Manalapan, NJ (US); David Basore, Little Silver, NJ (US); Jeffri Frontz, Columbus, OH (US); Gary A. Munson, Little Silver, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1497 days.

(21) Appl. No.: 11/285,441

(22) Filed: Nov. 22, 2005

(51) Int. Cl.
*H04L 12/66* (2006.01)

(52) U.S. Cl. .................... 370/352; 379/88.12; 719/328; 370/261; 370/229

(58) Field of Classification Search ............... 379/88.12; 719/328; 370/352
See application file for complete search history.

(56) References Cited

U.S. PATENT DOCUMENTS

| | | | |
|---|---|---|---|
| 6,574,469 B1 | 6/2003 | Xiang et al. | |
| 6,728,239 B1 | 4/2004 | Kung et al. | |
| 2002/0136369 A1 | 9/2002 | Robohm et al. | |
| 2002/0176404 A1* | 11/2002 | Girard | 370/352 |
| 2003/0118160 A1* | 6/2003 | Holt et al. | 379/88.12 |
| 2003/0206546 A1 | 11/2003 | Beyda | |
| 2005/0094623 A1 | 5/2005 | D'Eletto | |
| 2005/0105464 A1 | 5/2005 | Acharya et al. | |
| 2006/0112400 A1* | 5/2006 | Zhang et al. | 719/328 |
| 2006/0251054 A1* | 11/2006 | Peters et al. | 370/352 |
| 2006/0268754 A1* | 11/2006 | Ibezim et al. | 370/261 |

OTHER PUBLICATIONS http://web.archive.org/web/20040811010521/http://www.csgnetwork.com/glossaryf.html.*

* cited by examiner

*Primary Examiner*—Ahmad F Matar
*Assistant Examiner*—Vedesh Rampersad

(57) ABSTRACT

Telecommunications systems for providing third party service support and call control in using a packet network are disclosed. The telecommunications systems for providing a Session Initiation Protocol (SIP) are based interface for third party service call control and communication connections and support via an external application gateway in communication with a call control element of a packet network. The external application gateway signals a third party application server that controls the call via the SIP interface. The systems include border elements located between the call control elements of the packet network and the media servers of communication systems for providing SIP and media interfaces for the third party media servers or endpoints, which can be located inside or outside of the packet network. The systems include the reuse of existing network architectural elements to provide third party communications support and call control.

17 Claims, 2 Drawing Sheets

THIRD PARTY SERVICE SUPPORT WITH A VOICE OVER INTERNET PROTOCOL (VOIP) NETWORK

FIELD

The embodiments relate to telecommunication systems for providing a Session Initiation Protocol (SIP)—based interface for third party service control and communications via an external application gateway to a packet network.

BACKGROUND

Packet switched networks can route data traffic or packets of data using Internet Protocol networks. A Voice over Internet Protocol (VoIP) network is an example of a packet network that allows voice traffic (e.g., telephone calls) to be carried over an Internet Protocol (IP) network between two telephones, two computers systems, or similar communication devices.

VoIP networks today support sophisticated vertical features and services through the use of application logic in network-internal softswitches or application servers, where the latter are invoked by network call control elements that handle basic call control functions such as routing or recording. In order to reduce costs, reduce time to market, make use of intellectual property owned by a third party, or to mitigate risk, support feature and service application logic could be provided through the use of third-party application servers external to the network.

One commonly known system of providing third party service support is by using the Parlay interface. The Parlay interface allows a third party system to connect to a VoIP network using a Parlay interface, where an element at the edge of the network interworks to a protocol recognized within the network such as the Session Initiation Protocol (SIP); however, that approach is relatively complicated in terms of the Parlay protocol scope and the need for protocol interworking.

Another known system of providing third party service support is by delivering a call, including a media path, to a third party device for service processing, where later the call is re-routed to its ultimate destination. This re-routing system may in some cases be achieved by releasing the call back into the network and re-routing from the network (for example, if no more service processing is required). The re-routing may instead have to be done by forwarding the call through the third-party device (for example, if additional service processing is needed such as monitoring the caller for DTMF digits input, or later playing an announcement to the caller). In either case, this approach uses considerably more of the packet network and the third party resources to handle the call than what the network providers and third parties would like to allocate.

Thus, a need exists to provide a telecommunications system for allowing third party application servers to connect to packet networks for service control and communications support through a relatively simple and common interface, without excessive use of the network's or the third party's resources.

A need exists for a telecommunications system for use by a third party that can reuse existing network architectural components and elements and common vendor equipment to provide communication connections and call control via an external application gateway and a third party application server using a Session Initiation Protocol (SIP)—based interface for interacting with a packet network.

A need exists for providing a telecommunications system that can use an external application gateway and external server systems in communication with a packet network (e.g., VoIP) to support a third party service application (for example, prepaid calling card service) and effectively minimize the costs for providing the service.

The embodiments meet these needs.

SUMMARY

The embodiments relate to telecommunication systems for providing a Session Initiation Protocol (SIP)—based interface for third party service control and communication connections and support via an external application gateway to a packet network, such as a Voice over Internet Protocol (VoIP) network.

The telecommunications systems are for providing third party service support and call control in using a packet network, such as an Internet Protocol network, a Voice over Internet Protocol (VoIP) network, similar networks, or combinations thereof. The telecommunications system provides a Session Initiation Protocol (SIP)—based interface for third party service call control and communication connections via an external application gateway in communication with a call control element of the packet network. A third party application server communicates through the external application gateway using the Session Initiation Protocol (SIP) protocol to control calls.

Call control elements (CCE) are located within the packet network infrastructure (for example, VoIP Infrastructure) and are connected to border elements using the Session Initiation Protocol (SIP) over the underlying Internet Protocol-based packet network. A call control element (CCE) performs network-wide basic call control related functions such as routing and recording or invoking network-internal application servers, and interacts with the appropriate packet network servers (for example, VoIP application servers, registration servers, policy servers, and the like) and border elements.

The telecommunications systems include border elements that are the edge elements of the network through which calls enter or exit the network, and that therefore connect to external communication systems such as other IP or public switched telephony networks, IP or circuit-switched customer premises equipment, or network-external IP media servers. The border elements operate under the control of call control elements and perform such functions as: protocol interworking (for example, H.323 to SIP or IP version 4 to IP version 6), transcoding, bandwidth control, security, call admission control and other related functions.

The embodied telecommunication systems provide for the reuse of existing network architectural components and elements to provide communications support and call control service for a third party while minimizing costs related to resources. The systems utilize a network-based external application gateway that interfaces to both network call control elements and third party application servers using the Session Initiation Protocol (SIP), wherein a network call control element interacts with the external application gateway as though it is a network-internal application server, and the third party application server interacts with the external application gateway as though it is a network call control element. With this arrangement, a third party application server can control a call to the same extent as a network-internal application server, subject to any constraints intentionally imposed by the external application gateway as desired by the network provider.

BRIEF DESCRIPTION OF THE DRAWINGS

The detailed description will be better understood in conjunction with the accompanying drawings as follows.

Figure 1:
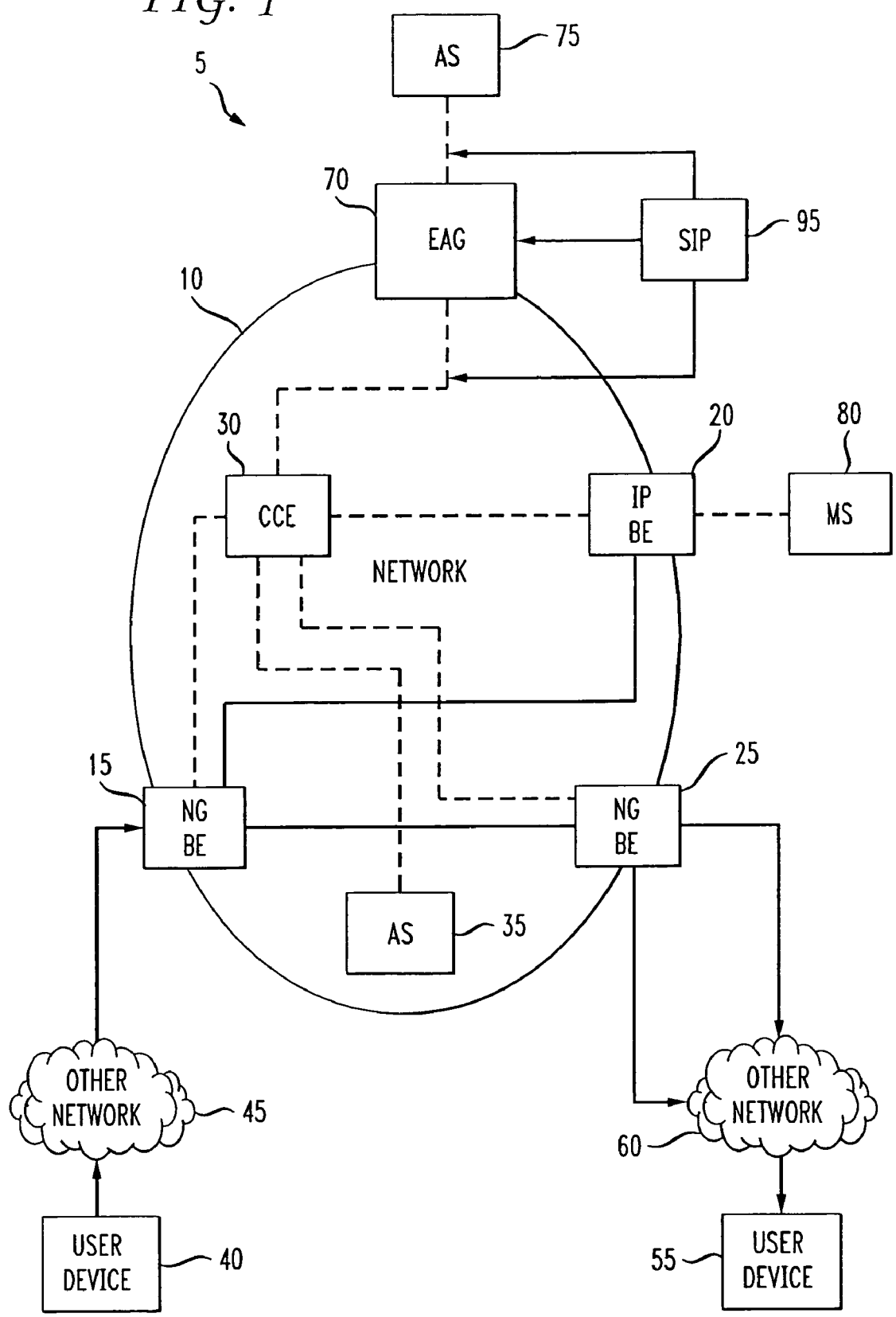
FIG. 1 depicts an embodiment of a telecommunications system for providing third party call service control and communications support in using a packet network.

The present embodiments are detailed below with reference to the listed Figures.

DETAILED DESCRIPTION OF THE EMBODIMENTS

Before explaining the presently disclosed embodiments of the invention in detail, it is to be understood that the invention is not limited to the particular embodiments, and that the invention can be practiced or carried out in various ways.

The embodiments relate to telecommunications systems for providing a Session Initiation Protocol (SIP)—based interface for third party service control and communications support via an external application gateway to a packet network.

Service logic for services, such as Prepaid Calling Card (PPC) calls, directory or operator assistance, and Toll-Free services, can be provided by a third party service provider that connects a third party application server to the network through an external application gateway with a Session Initiation Protocol (SIP)—based interface. The telecommunication system can limit the scope of the services and control provided by the third party application server, regulate the information provided to the third party application server, and provide a level of security for interactions with that third party application server.

The embodiments can include telecommunications systems for providing third party service support and call control. The third party service support and call control can include a packet network containing, among other things, a call control element (CCE), a border element (BE) in communication with the call control element (CCE), and an external application gateway in communication with the call control element (CCE).

The border elements (BE) of the telecommunication system are the edge elements of the network through which calls enter or exit the network, and that therefore connect to external communication systems. Border elements that connect to external IP-based communication systems are sometimes referred to as IP border elements (IPBE). Border elements that connect to circuit-switched communication systems are sometimes referred to as Network Gateway border elements (NGBE). Border elements operate under the control of a network call control element (CCE). The border elements can perform such functions as signaling, protocol interworking, transcoding, bandwidth control, monitoring for DTMF digits, security, call admission control and other related functions. On any given call a border element (BE) can operate as an ingress border element, an egress border element, or both.

The embodiments can include a call control element within the Internet Protocol-based packet network core infrastructure. A call control element (CCE) can be connected to the border elements (BE) using a Session Initiation Protocol (SIP)-based interface. Examples of a Session Initiation Protocol (SIP)-based interface include a softswitch, a call agent, a call session controller, or the like. The call control element (CCE) can perform network-wide call control related functions such as routing and recording, as well as interact with the appropriate packet network service-related application servers, when required. The call control element (CCE) can be a signaling intermediary among the border elements (BE) and/or network-internal media servers. The call control element can interact with various packet network related servers (for example, VoIP related servers) in order to complete a call that requires certain capabilities, such as a translation of an E.164 voice network address into a Session Initiation Protocol (SIP) address or vice-versa, or signaling functions such as relaying a request to the ingress border element from a network-internal application server or external application gateway to perform monitoring of a calling or called party's media stream for DTMF digits input.

The embodiments permit the call control element to signal the external application gateway to handle telecommunications service support (for example, for incoming calls), wherein the external application gateway can appear to the call control element as a network-internal application server and the third party application server that the external application gateway communicates with is not visible to the network call control element. The external application gateway can include components having business logic applications for performing such functions as screening and security with regard to messages passed to the third party application server. Further, the external application gateway can include screening and security functions to restrict the third party application server's interactions with the packet network. The screening functions can include throttling to control traffic volume to the packet network; protection from external unauthorized use using SIP signaling; and screening of addresses, message type, message content, and combinations thereof.

The external application gateway can provide a Session Initiation Protocol (SIP)-based interface to a third party application server that may include a customer database for customer or third party call and service information. The external application gateway can signal with a third party application server to allow the external application gateway to control a telecommunications call via the SIP interface, as the external application gateway can appear to the third party application server as a network call control element.

The telecommunications system includes a third party application server that can be adapted for controlling call delivery to customer endpoints and for signaling the external application gateway regarding connections to media servers of communication systems for applying media-related capabilities (for example, prompt and collect, conferencing, speech recognition) as determined by the third party service application logic. Examples of services that the Service logic can provide include prepaid calling services, 800 toll free calling services, Voice over Internet Protocol telephony services, content based services, teleconferencing services, virtual private network services, commercial credit card calling card services, directory assistance services, operator services, and combinations thereof. Examples of content-based services of the service logic include Internet Protocol television services, live stock quoting services, weather information, streaming radio services, and combinations thereof.

The telecommunications system includes a communication system external to the packet network, which can be IP-based customer equipment, circuit-switched customer equipment, or a media server. Further, the communication system can include one or more public switched telephony networks, Voice over Internet Protocol (IP) networks, similar networks, or combinations thereof.

The embodiments can include a media server of a communication system external to the packet network. Examples of media servers usable in the systems include video servers, audio servers, rich media servers, conferencing servers, and combinations thereof. Alternatively, the media server can be within the packet network.

The telecommunications system allows the media server to be directed by a third party application server to provide media content or interactions with a caller on an incoming call. For example, an incoming prepaid calling card (PCC) call from a customer can be received by a call control element of an IP packet network via a network access and a border element. Then, the call control element can signal an external application gateway for prepaid card support, which in turn signals over a SIP-based interface to a third party application server. The third party application server can request a connection to a media server. Example of a purpose for making a connection to the media server may be to collect a card personal identification number (PIN), to collect a desired called party number from the caller, to inform the caller of the remaining balance on the card, or to play an announcement warning the caller that the card balance is about to deplete. The call path to the media server is removed, as requested by the third party application server, when not needed. The third party application server can redirect the caller back with the called party. When a given call is sent to a media server as requested by the third party application server, the associated signaling may convey a correlation ID provided by the third party application server. The media server may use that correlation ID to associate instructions, containing the same correlation ID, received by the media server from the third party application server via a separate communication path. Examples of instructions include playing an announcement, collecting input from the caller, or connecting the caller to a conference.

With regard to the figures, FIG. 1 depicts an embodiment of a telecommunications system (5) for providing third party call service control and communications support in using a packet network (10), such as Voice over Internet Protocol (VoIP) network. The packet network (10) core infrastructure can include border elements (BE), which for any given call and depending on type of connectivity can operate in such roles as an ingress network gateway border element (iNGBE) (15). The packet network (10) core infrastructure can include an egress Internet Protocol border element (eIPBE) (20), an egress network gateway border element (eNGBE) (25), and a call control element (CCE) (30).

The border elements (15, 20, and 25) can reside at the edges of the packet network (10) core infrastructure and can interface with customer endpoints (40 and 55) over various types of access networks (45 and 60) such as local exchange carriers (LECs) as well as interface to external IP media servers (80) or other external communication systems The call control element (30) is included within the packet network (10) core infrastructure and can be connected to the border elements (15, 20, and 25) using Session Initiation Protocol (SIP) (95)-based interfaces. The call control element (30) performs network-wide basic call control related functions. The call control element (30) can use the Session Initiation Protocol to interact with internal application servers (35) or external application gateways (70) that the call control element (30) perceives as internal application servers. The call control element (30) can interact with various other packet network related servers (for example, registration servers, policy servers, servers translating between E.164 addresses and Session Initiation Protocol (SIP) addresses) in order to complete a call.

The call control element (30) can determine that an application server needs to be invoked to provide service support for a call, and can signal the external application gateway (70) that it regards as an internal application server. The external application gateway (70) in turn, using the Session Initiation Protocol (SIP) (95), communicates with the third party application server that provides the actual service logic support. The external application gateway (70) includes components having business logic applications for performing such functions as screening and security with regard to communicating with the third party application server (75). The third party application server (75) can be adapted for controlling calls, including the delivery to customer endpoints (55) or media servers (80), and for applying certain service logic to calls, such as for prepaid calling card services.

Figure 2:
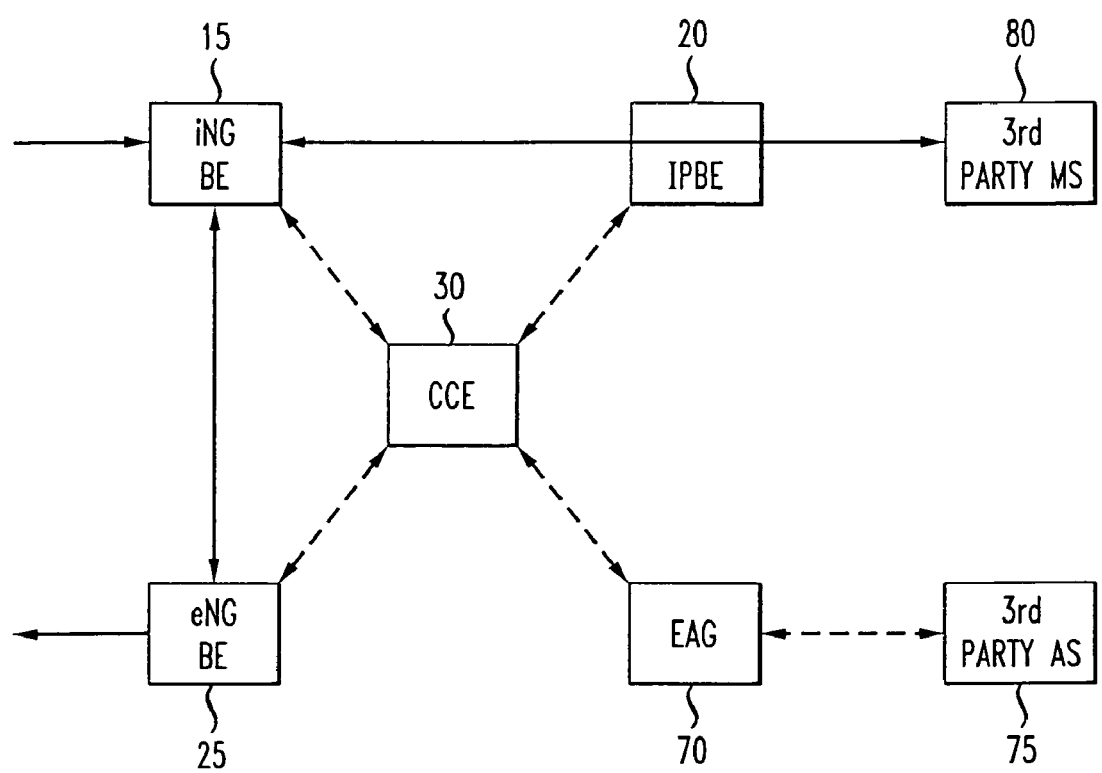
FIG. 2 depicts a diagram of a high-level call flow using a telecommunications system for providing third party call service control and communications support in using a packet network.

FIG. 2 depicts a diagram of a high-level call flow using a telecommunications system for providing third party call service control and communications support in using a packet network (for example, VoIP). An incoming call is received at an ingress border element. In this case, an ingress network gateway border element (iNGBE) (15) signals a call control element (CCE) (30) when an incoming call is present at the border element (15). The call control element (CCE) (30) determines that an application server (75) needs to be invoked to provide service logic to the incoming call and signals an external application gateway (EAG) (70) to handle the incoming call. The external application gateway (EAG) (70) can appear to the call control element (CCE) (30) as an internal application server.

The external application gateway (EAG) (70) performs screening and security functions with regard to the signaling received from the call control element (30) and, then, signals the third party application server (75) for the step of applying service logic to the incoming call. Next, the third party application server (75) signals the external application gateway (EAG) (70) to connect the incoming call to a third party media server of a communication system (80), which initiates additional screening and security functions by the external application gateway (EAG) (70) prior to forwarding the connection request to the call control element (30).

To perform the connection, the call control element (CCE) (30) locates a border element. In this case, an IP border element (20) in communication with the particular media server (80) signals the border elements (15 and 20) to establish the media path between the border elements. The IP border element (20) signals the border element (20) to connect to the external media server (80) as indicated by particular address or routing information. The border element (20) performs a network access service control and security function prior to signaling the media server (80) to connect the incoming call to the media server (80) for call service and features. The signaling from the third party application server (75) through the external application gateway (70), call control element (30), and border element (20) to the media server (80) can include a correlation ID that the media server (80) can use to associate a particular incoming call with the appropriate instructions arriving from the third party application server (75) through an entirely different communication path.

The third party application server (75) can then signal to the external application gateway (70) to drop the call leg to the media server (80). The call leg to the media server (80) is dropped by additional signaling from the external application gateway (70) to the call control element (30) to the border element (20) to the media server (80). Then, the third party application server (75) can signal to the external application gateway (70) to connect the caller to a called party. This new connection can involve signaling from the external application gateway (70) to the call control element (30), which identifies the appropriate egress border element (25) and then signals with border elements (15 and 25) to establish the media path between them. The external application gateway (70) then signals to the call control element (30) with the border element (25) to communicate with the communication system outside the network to progress the call establishment toward the called party. When messaging goes through the external application gateway (70), the external application gateway (70) is performing various functions related to security, manipulating some of the message content, verifying that requests from the third party application server (75) that are within its allowed scope, and so on. The example depicted in FIG. 2 glosses over details of use of the Session Initiation Protocol (SIP), such as actual message sequences between the various elements depicted.

The third party application server (75) can request the network, via the external application gateway (70), to perform other functions in support of the call, such as monitoring for DTMF digits input from the caller. That particular example involves the request being relayed to the border element (15) via the external application gateway (70) and call control element (30), wherein the border element (15) performs the monitoring. The third party application server (75) can make other requests during the call. For example, third party application server (75) can request that the called party leg be temporarily placed on hold and reconnect the caller to a media server. The communication between the third party application server (75) and the external application gateway (70) can persist for the duration of the call or even multiple calls, for example in the case of sequence calls with a prepaid calling card service.

While these embodiments have been described with emphasis on the embodiments, it can be understood that within the scope of the appended claims, the embodiments might be practiced other than as specifically described herein.

What is claimed is:

1. A telecommunication system for use in a packet network, comprising:
    a call control element within the packet network;
    a border element located within the packet network and connected to an external communication system, wherein the border element is in communication with the call control element; and
    an external application gateway in the packet network in communication with the call control element and a third party application server in the external communication system, wherein the external application gateway presents an interface to the call control element, wherein the external application gateway appears to the call control element as an application server internal to the packet network, wherein the external application gateway presents an interface to the third party application server, wherein the external application gateway appears to the third party application server as a network call control element.

2. The system of claim 1, wherein the third party application server comprises service logic.

3. The system of claim 2, wherein the service logic comprises one of: a prepaid calling service, a toll free calling service, a voice over internet protocol telephony service, a content based service, a teleconferencing service, a virtual private network service, a commercial credit card calling card service, a directory assistance service, or an operator service.

4. The system of claim 3, wherein the content based service comprises one of: an internet protocol television service, a live stock quoting, current weather information, or a streaming radio service.

5. The system of claim 1, further comprising a media server comprising one of: a video server, an audio server, a rich media server, or a conferencing server.

6. The system of claim 1, wherein the external communication system includes a customer connection, a non-customer communication network, or a media server.

7. The system of claim 6, wherein the media server is in communication with the third party application server.

8. The system of claim 6, wherein the external communication system comprises a public switched telephony network or a voice over internet protocol network.

9. The system of claim 1, wherein the system is configured to pass a unique correlation identifier in call signaling from the third party application server via the external application gateway, call control element and border element to a media server of the external communication system.

10. The system of claim 1, wherein the border element is an internet protocol border element or a network gateway border element.

11. The system of claim 1, further comprising a media server within the packet network.

12. The system of claim 1, wherein the system is configured to connect a call across the packet network from one border element to another border element and thence to the external communication system.

13. The system of claim 1, wherein the external application gateway uses a session initiation protocol to communicate with the third party application server.

14. The system of claim 1, wherein the call control element is a softswitch, a call agent, or a call session controller.

15. The system of claim 1, wherein the external application gateway further comprises screening and security functions to restrict the third party application server's interactions with the packet network.

16. The system of claim 15, wherein the screening and security functions comprise throttling to control traffic volume to the packet network.

17. The system of claim 15, wherein the screening and security functions comprise one of: a screening of address information, a screening of message type, a screening of message content, or a protection from external unauthorized use by using session initiation protocol signaling.

* * * * *

UNITED STATES PATENT AND TRADEMARK OFFICE
CERTIFICATE OF CORRECTION

| | |
|---|---|
| PATENT NO. | : 7,899,032 B1 |
| APPLICATION NO. | : 11/285441 |
| DATED | : March 1, 2011 |
| INVENTOR(S) | : Siroos Afshar et al. |

It is certified that error appears in the above-identified patent and that said Letters Patent is hereby corrected as shown below:

Title page
Item [75], Inventors, after line 4, add --Peter L. Ng--

Signed and Sealed this
Tenth Day of May, 2011

David J. Kappos
*Director of the United States Patent and Trademark Office*